United States Patent
Lamy (10) Patent No.: US 11,928,337 B2
(45) Date of Patent: Mar. 12, 2024

(54) METHOD FOR MANAGING A DATA GROUP IN A COMPUTER SYSTEM

(71) Applicant: SHADOW, Paris (FR)

(72) Inventor: Arnaud Lamy, Asnieres sur Seine (FR)

(73) Assignee: SHADOW, Paris (FR)

( * ) Notice: Subject to any disclaimer, the term of this patent is extended or adjusted under 35 U.S.C. 154(b) by 40 days.

(21) Appl. No.: 17/753,534

(22) PCT Filed: Aug. 31, 2020

(86) PCT No.: PCT/FR2020/051513
§ 371 (c)(1),
(2) Date: Mar. 7, 2022

(87) PCT Pub. No.: WO2021/044094
PCT Pub. Date: Mar. 11, 2021

(65) Prior Publication Data
US 2022/0382461 A1  Dec. 1, 2022

(30) Foreign Application Priority Data

Sep. 5, 2019 (FR) ...................................... 1909787

(51) Int. Cl.
*G06F 3/06* (2006.01)
(52) U.S. Cl.
CPC .......... *G06F 3/0614* (2013.01); *G06F 3/0646* (2013.01); *G06F 3/067* (2013.01)
(58) Field of Classification Search
None
See application file for complete search history.

(56) References Cited

U.S. PATENT DOCUMENTS

| | | | |
|---|---|---|---|
| 8,935,506 B1 * | 1/2015 | Gopalan | G06F 12/1009 711/202 |
| 10,372,683 B1 | 8/2019 | Wang et al. | |
| 2012/0221817 A1 | 8/2012 | Yueh | |

(Continued)

OTHER PUBLICATIONS

International Search Report for International Application No. PCT/FR2020/051513 dated Dec. 14, 2020, 2 pages.

(Continued)

*Primary Examiner* — Edward J Dudek, Jr.
*Assistant Examiner* — Ralph A Verderamo, III
(74) *Attorney, Agent, or Firm* — TraskBritt (57) ABSTRACT

A method for managing a data record in a computer system comprises: at least one computing server for hosting a computer session running with an operating system having a deduplication index and managing access to a session storage space; a shared storage space; an administration server for administering the shared storage space, executing a data management program; the computer session executing an interception program implementing the following steps: intercepting a read call to read at least one data record transmitted in the session; accessing the deduplication index and determining whether the data record is recorded in the shared storage space; if so, reading, from the deduplication index, the address of the data record in the shared storage space and redirecting the read call to this address; if not, overlooking the read call so that it is processed by the operating system.

8 Claims, 3 Drawing Sheets

(56) References Cited

U.S. PATENT DOCUMENTS

| | | | |
|---|---|---|---|
| 2014/0244599 A1* | 8/2014 | Zhang | G06F 3/0641 |
| | | | 707/692 |
| 2015/0074065 A1 | 3/2015 | Christ et al. | |
| 2017/0031945 A1* | 2/2017 | Sarab | G06F 16/1748 |
| 2018/0081561 A1* | 3/2018 | Todd | G06F 11/1453 |
| 2018/0143780 A1* | 5/2018 | Cho | G06F 3/0688 |
| 2019/0332303 A1* | 10/2019 | Watkins | G06F 3/0641 |

OTHER PUBLICATIONS

International Written Opinion for International Application No. PCT/FR2020/051513 dated Dec. 14, 2020, 9 pages.

\* cited by examiner

METHOD FOR MANAGING A DATA GROUP IN A COMPUTER SYSTEM

CROSS-REFERENCE TO RELATED APPLICATIONS

This application is a national phase entry under 35 U.S.C. § 371 of International Patent Application PCT/FR2020/051513, filed Aug. 31, 2020, designating the United States of America and published as International Patent Publication WO 2021/044094 A1 on Mar. 11, 2021, which claims the benefit under Article 8 of the Patent Cooperation Treaty to French Patent Application Serial No. FR1909787, filed Sep. 5, 2019.

TECHNICAL FIELD

The present disclosure relates to a method for managing a data group that is deduplicated in a computer network.

BACKGROUND

In a computer network, the users may be required to handle, in their respective session, the same computer file, for example, an application or a data file.

Generally, this situation leads to registering the computer file in the storage space associated with each session, and thus to deduplicating it, which tends to occupy significant storage space. In order to rationalize this, it is possible to provide for the computer file to be made available in a shared storage space, which each session can access. However, this solution is not always practical, because it forces the user to access the shared storage space, which imposes restrictions on the user. Moreover, access to a shared storage space may introduce an access latency, which is disadvantageous for the user.

The management of the data storage space and of the speed of access to the data arises, in particular, in a computer architecture of the "cloud" type.

In an architecture of this kind, an administrator provides and pools a large number of computer resources, such as computing servers, and storage devices, which it keeps in service in a centralized data center. The users access these resources from a remote client.

It is important, in a context of this kind, to be able to avoid the duplication of data in order to limit the storage space required and the energy consumption of the data center. Preferably, the management of the deduplication of the data must be able to be performed without noticeably affecting the performance of the system, and without it modifying the practices of the users.

The U.S. Patent application US2012221817A1 discloses a mechanism that makes it possible to avoid duplication of data in a computer architecture. Each storage system of the architecture consults a local hash table and an overall hash table in order to determine whether the data has to be written locally or whether a simple pointer to the data present in another storage system of the architecture is sufficient.

This mechanism leads to a specified data block being stored just once in the computer architecture, and all the calls to this block are redirected to its single storage location, without ever creating redundant data. In formal terms, the data are thus not deduplicated. Of course, this presupposes that the storage systems are all, and permanently, accessible, in order not to lose access to these data, which is not the case in all the computer architectures.

BRIEF SUMMARY

An aim of the present disclosure is that of proposing an at least partial solution to the problem. More particularly, the present disclosure aims to deduplicate data produced by computer sessions that each comprise their own storage space, and the execution of which is intermittent.

With the aim of achieving this aim, the object of the present disclosure proposes a method for managing a data group in a computer system, comprising:
  at least one computing server for hosting a computer session running with the aid of an operating system having a deduplication index and managing access to a session storage space;
  a shared storage space;
  an administration server for administering the shared storage space, executing a data management program;
the computer session executing a synchronization program implementing the following steps:
  identifying writing of at least one data group transmitted in the session;
  addressing a synchronization request for the data group to the data management program of the administration server;
  if applicable, receiving from the data management program a storage address of the data group in the shared storage space, and accessing the deduplication index in order to record, therein, the address of the data group in the shared storage space; and
the synchronization program also implementing the following steps:
  receiving an acceptance of synchronization of the data group from the data management program; and
  providing the data group to the data management program.

According to other advantageous and non-limiting features of the present disclosure, taken individually or in any technically possible combination:
  the computer session also executes an interception program implementing the following steps:
    intercepting a read call to read at least one data group transmitted in the session;
    accessing the deduplication index and determining whether the data group is recorded in the shared storage space;
    if so, reading, from the deduplication index, the address of the data group in the shared storage space and redirecting the read call to this address; and
    if not, overlooking the read call so that it is processed by the operating system;
  the interception program also implements the following steps:
    identifying a read failure of the data group in the shared storage space;
    requesting a new address of the data group in the shared storage space from the administration server;
    receiving the new address of the data group and accessing the deduplication index in order to register the new address of the data group; and
    redirecting the read call toward the new address of the data group in the shared storage space.

According to another aspect, the present disclosure proposes a method for managing a data group in a computer system comprising:
  at least one computing server for hosting at least one computer session running with the aid of an operating system having a deduplication index and managing access to a session storage space;
a shared storage space;
an administration server for administering the shared storage space hosting a metadata index and executing a data management program; and the data management program implementing the following steps:
receiving a synchronization request for a data group from a computer session;
consulting the metadata index in order to determine whether the data group is stored in the shared storage space;
if so, returning a storage address of the data group in the shared storage space to the computer session;
if not, incrementing a synchronization request counter of the data group and, if the counter exceeds a predetermined threshold;
addressing an acceptance of synchronization of the data group to at least one computer session;
receiving the data group from the computer session, and registering the data group in an address of the shared storage space; and
accessing the metadata index in order to register the address of the data group in the shared storage space.

Advantageously, the acceptance of synchronization of the data group is addressed to a plurality of computer sessions.

BRIEF DESCRIPTION OF THE DRAWINGS

Other features and advantages of the present disclosure will become clear from the following detailed description of the present disclosure, with reference to the accompanying drawings, in which.

DETAILED DESCRIPTION

Figure 1:
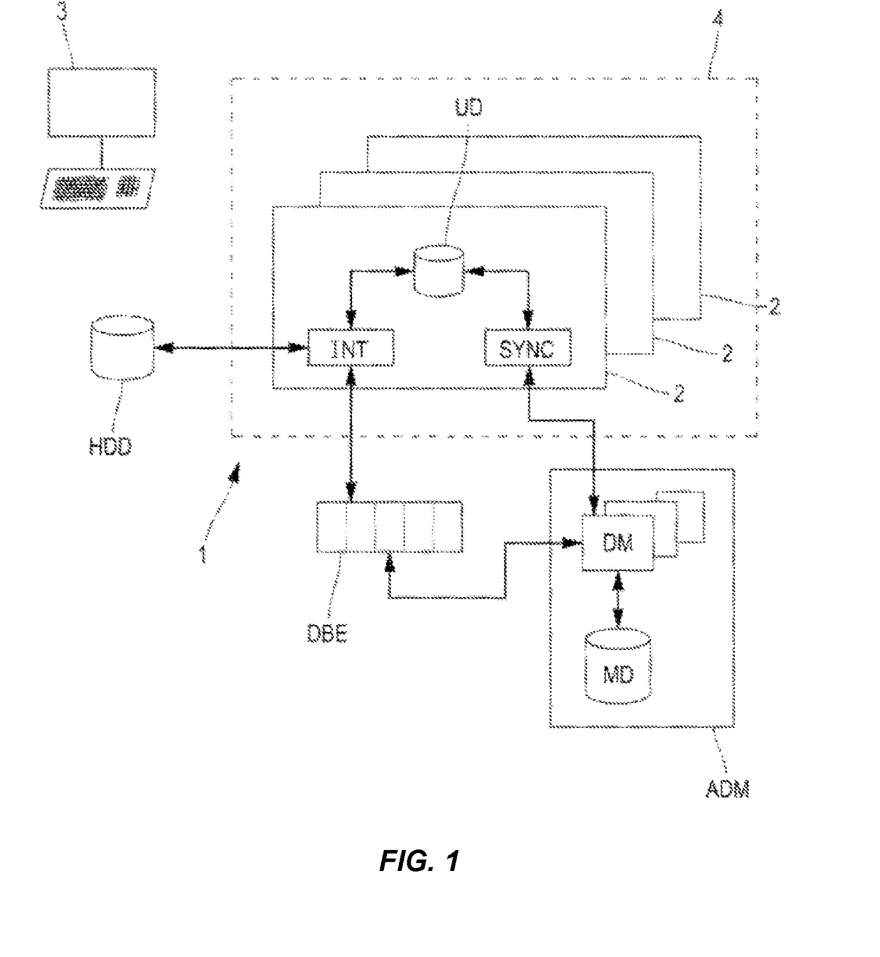
FIG. 1 shows an architecture of a computer system that is compatible with a method according to the present disclosure.

FIG. 1 shows an architecture of a computer system 1 that is compatible with a method for managing a data group according to the present disclosure.

A plurality of computer sessions 2 runs on at least one computing server 4 of the computer system 1. Each session 2 is connected to a remote client 3 with which it exchanges session data via a computer network, such as the Internet network. The computing servers 4 may be designed to host a plurality of virtual machines that form environments that are mutually separate and host, respectively, the computer sessions 2 of the user. Each computer session 2 thus has access, by way of an operating system, to all the resources of the virtual machine, which perfectly emulates a real machine. The virtual machine, in particular, provides the computer session 2 with a session storage space HDD (typically appearing in the session 2 as a conventional hard disk) in which the session user can store all their data and their applications. For this purpose, the computer system 1 may comprise a plurality of storage servers, connected to the computing server 4, for hosting the session storage spaces HDD of the sessions 2. A computer system 1 may host several hundred, or even several thousand, computer sessions 2.

As is well known per se, the operating system of the virtual machine supporting the computer session 2 administers the data recorded in the session storage space HDD by way of a file management system. This may be, for example, an NTFS file management system.

When an application of the session 2 starts a read or write operation on a file or a portion of a computer file (more generally referred to as "data group" in the present description) in the session storage space HDD, the operating system calls on the file management system to actually perform the read or write operations for the data on the physical or logical medium that forms the session storage space HDD.

The computer architecture of FIG. 1 also comprises a shared storage space DBE comprising a plurality of other network storage servers, typically of the SAN or NAS type. Data are recorded in the shared storage space DBE under the control of an administration server ADM of the computer system 1.

Within the context of the present disclosure, the computer system 1 is configured to deduplicate data groups that are duplicated in the session storage spaces HDD. Indeed, it is frequently the case that a plurality of computer sessions 2 runs the same application or handles the same data file, or applications or files that are very similar to one another, i.e., sharing most of the data groups. In a conventional manner, the common data groups are recorded in the session storage servers HDD as many times as the number of sessions 2 making use of the data groups.

The method for managing deduplicated data groups, to which the present description relates, aims to prevent or limit this phenomenon that takes up significant storage space. More precisely, the method identifies at least one data group that is deduplicated in the session storage spaces HDD and replaces them with a unique data group of the shared storage space DBE. The computer sessions 2 access (i.e., perform a read or write operation) the data groups that they use in an entirely transparent manner, i.e., the deduplicated data groups appear for the computer sessions 2 and for the applications running there just like any other data group recorded in the session storage space HDD.

In order to achieve this object, the operating system of the virtual machine on which a computer session 2 that manages access to the session storage space HDD runs, has a deduplication index UD. In a general manner, the index UD makes it possible to identify the data groups recorded in the shared storage space DBE and to distinguish them from those recorded in the session storage space HDD. For this reason, the deduplication index UD associates an identification key ID of a data group with an address (IP) of the data group in the shared storage space DBE.

The read/write access of a session to the data groups recorded in the session storage space HDD may be implemented without particular intervention by the application, and performed in a conventional manner by the operating system of the virtual machine. The read/write access of a session to the data groups recorded in the shared storage space DBE is in turn identified or intercepted in order to initiate suitable processing. For this purpose, the computer session 2 (and more precisely each computer session 2 of the computer system 1) executes, in a background task on the virtual machine, an interception program INT and a synchronization program SYNC that implement steps that will be described in a subsequent part of this description.

The deduplication index UD is advantageously implemented while exploiting the functionalities of the file management system of the operating system of the virtual machine on which the session 2 runs. A file management system of this kind generally comprises a reference table made up of a plurality of records, each record making it possible to associate the file name with one or a plurality of data groups and a plurality of attributes intended to characterize the data groups.

In an advantageous embodiment of the present disclosure, the identification key ID of a data group and the address (IP) of the data group in the shared storage space DBE form attributes of the data group in the corresponding record of the file management system. Thus, in this embodiment, the deduplication index is perfectly integrated in the file management system of the operating system of the virtual machine on which the session runs. The identification key ID of a data group may correspond to a digital fingerprint of the group, for example, calculated using a hash function such as the function MD5. A function of this kind makes it possible to represent a data group in the form of a fingerprint of 128 bits (32 hexadecimal characters) with a very high probability of two different groups being identified by two different fingerprints. Of course, the present disclosure is not limited to the creation of a group identification key by a hash function of this kind, and any other method that makes it possible to establish a unique key per data group may be suitable.

In order to allow for implementation of a method for managing a data group according to the present disclosure, the administration server ADM keeps a metadata index MD. This index also associates, if applicable, the identification key ID of a data group with the storage address (IP) thereof in the shared storage space DBE. When a data group is not recorded in the shared storage space DBE, the metadata index MD does not have an entry corresponding to the identification key ID of the data group, or the entry is associated with an address (IP) for which there is no information.

The function of the metadata index MD is that of listing all the data groups held in the shared storage space DBE. This index is administered by the data management program DM that runs on the administration server ADM. The deduplication indices UD of the computer sessions 2 in turn aim to reliably but partially replicate the metadata index MD, only for the data groups that the sessions respectively need to access (i.e., for the data groups that are eligible to be recorded in the respective session storage spaces HDD). According to the present disclosure, the replication of the metadata index MD in the deduplication indices UD of the sessions 2 is performed in an asynchronous manner by the synchronization programs SYNC running on the virtual machines of the sessions 2, and by the data management program DM running on the administration server ADM.

Figure 2:
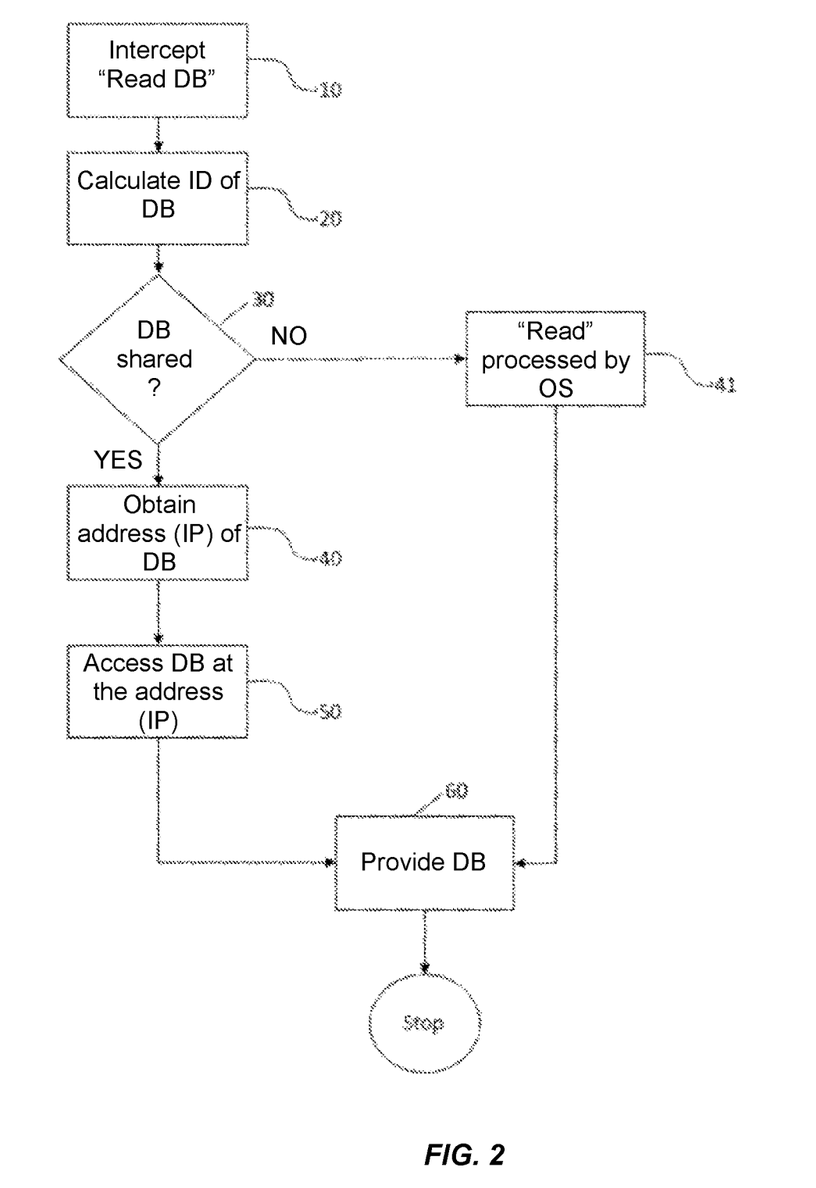
FIG. 2 shows the steps implemented by an interception program of a method according to the present disclosure.
Figure 3:
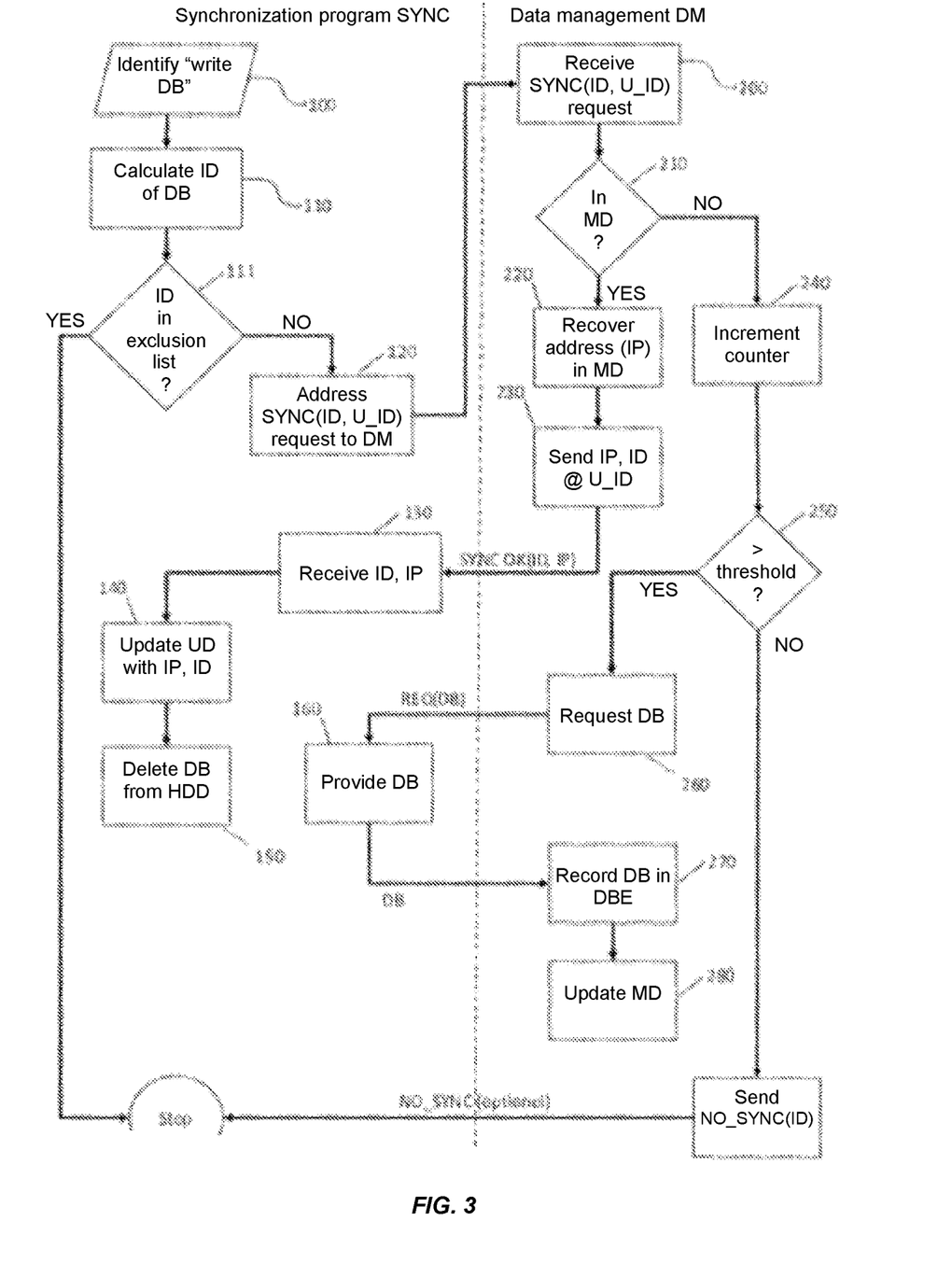
FIG. 3 shows the steps implemented by a synchronization program of a method according to the present disclosure.

With reference to FIGS. 2 and 3, an embodiment of the interception INT, synchronization SYNC, and data management DM programs of a method according to the present disclosure will now be described in detail.

Thus, FIG. 2 shows, in the form of a flowchart, the processing steps implemented by the interception program INT when an application running in the computer session 2 seeks to read at least one data group recorded in the session storage space HDD.

The processing by the interception program INT starts by a first step 10 intercepting a read call for reading a data group DB by the application. In a following step 20, the interception program determines the identification key ID of the data group DB, for example, by applying the hash function MD5 to the group.

In a step 30, the interception program INT consults the deduplication index UD associated with the session 2, in order to determine whether the data group DB is marked as deduplicated, i.e., whether it has been recorded in the shared storage space DBE.

For this purpose, it is sufficient to verify that the index UD does indeed have an entry corresponding to the identification key ID of the data group DB in question, and that the entry is indeed associated with a storage address (IP) in the shared storage space DBE.

If this is actually the case, the address (IP) is recovered during a following step 40, and the read call for reading the group is redirected to the address (IP) in the shared storage space, by way of the network interface of the virtual machine (step 50 in FIG. 2). This call is received by a network controller of the shared storage space DBE, and the corresponding data group is returned to the interception program INT that can, in a final step 60, return the requested data group DB to the application that requested it.

In the event of the consultation of the deduplication index UD leading to determining that the data group DB is not deduplicated in the shared storage space DBE, the interception program INT interrupts its intervention and allows the read call to be processed in a conventional manner by the operating system, using the file management system. The data group is then read into the session storage space HDD and returned to the requesting application (steps 41 and 60 of FIG. 2).

It is noted that the processing of a read call for reading a data group by an application is processed in a manner that is entirely transparent to the calling application, the session 2, or its user.

FIG. 3 shows the processing implemented by the synchronization program SYNC and by the data management program DM. This processing may be triggered in an asynchronous manner, after an application running in the computer session 2 has written at least one data group in the session storage space HDD. It may also be triggered when a data group is newly deduplicated, and thus recorded in an address of the shared storage space DBE.

With reference to FIG. 3, the synchronization program SYNC starts up, during a first identification step 100, writing of at least one data group DB, by an application, in the session storage space HDD. For this purpose, the operating system of the session 2 can keep a list or a journal of the write operations that the synchronization program SYNC can access, in an asynchronous manner with respect to these write operations.

In a following step 110, the synchronization program SYNC determines the identification key ID of the data group DB, for example, by applying the hash function MD5 to the group.

In a third step 120, the synchronization program SYNC addresses a synchronization request to the data management program DM of the administration server ADM. This request may include the transmission of the identification key ID of the data group to the data management program DM, in order that the group can be identified. The request may also include other attributes, such as a session identifier U_ID, the name of the file corresponding to the data group DB, etc.

It is optionally possible to provide a preceding step 111 of filtering, during which an attempt is made to identify whether the data group DB is part of an exclusion list held by the operating system of the virtual machine on which the session 2 is running. If this is indeed the case, the synchronization program SYNC is interrupted.

After this request has been sent, during the third step 120 the synchronization program SYNC interrupts its thread. It can then process another write instance of a data group, or wait for such an event to occur.

The synchronization program SYNC running in a session 2 comprises other threads that can start up in an asynchronous manner with respect to what has just been described. The threads can run following the synchronization request being sent, the processing of which request by the administration server ADM will be described in detail in a following part of this description.

Thus, and according to a first possibility (SYNC_OK), the data management program DM of the administration server ADM can return, to the synchronization program SYNC, an address (IP) of the shared storage space DBE in which the data group DB must be recorded. In practice, the message received by the synchronization program SYNC (step 130) may include the identification key ID of the data group DB and its address (IP), in order that the information can be decoded by the program. In a following step 140, the synchronization program SYNC accesses the deduplication index UD in order to update it, i.e., record, in this index, the storage address (IP) associated with the data group DB in the shared storage space DBE, and with the identification key ID of the group.

Consequently, the future read calls for reading the data group will actually be returned to the address (IP) of the shared storage space DBE, as has been shown in relation to the description of FIG. 2.

Finally, the data group DB can be deleted from the session storage space HDD during a deletion step 150, while of course keeping intact the entry of the deduplication index UD associated with the data group.

According to another possibility, the administration server ADM may return, to the synchronization program SYNC, an item of information NO_SYNC according to which the data group DB may not be deduplicated. As will be seen later in this description, this possibility arises when the administration server ADM determines that the data group DB is not sufficiently duplicated in the session storage spaces HDD to be deduplicated in the shared storage space DBE. The reception of such non-deduplication information NO_SYNC does not trigger any required action, and the communication of this information by the data management program DM is entirely optional.

According to yet another possibility for responding to the request for synchronization, which arises when the data group DB is not yet deduplicated, but for which the administration server ADM determines that it would be desirable for it to be deduplicated, the administration server ADM addresses a request to the synchronization program SYNC directing the program to provide the data group DB in question. In such a case, the synchronization program SYNC provides the data group DB to the administration server ADM during a transmission step 160, in order for the server to organize the registration of the data group in the shared storage space DBE.

The data transfer can be implemented by opening a partitioned transfer session of a data group between the administration server ADM and the user session. A transfer session of this kind, which is well known per se, makes it possible to autonomously manage the transfer of a data group, which may be of a high volume, by partitioning the data group and processing the anomalies that may arise during the transfer (for example, when the user session 2 is interrupted).

In addition, after the data group DB has been sent to the administration server ADM, the thread of the synchronization program SYNC is interrupted. Therefore, at this stage, the data group DB is not yet marked in the deduplication index UD of the computer session 2 as being deduplicated.

At any time, and in an asynchronous manner with respect to the write calls that the applications of the computer session 2 may initialize, the synchronization program SYNC may receive SYNC_OK requests from the administration server ADM (and more precisely from data management programs DM running on the server) indicating that a specified data group, identified by its identification key ID, has indeed been recorded in the shared storage space DBE, at a specified storage address (IP).

Upon receipt of the request SYNC_OK during the reception step 130, the synchronization program SYNC executes, in a following step, the updating of the deduplication index UD (step 140) by recording and associating, in the index, the identification key ID and the storage address (IP) of the group DB, and deletes it from the session storage space HDD (step 150). Consequently, the future read calls for reading the data group, intercepted by the interception program INT as has been described with reference to FIG. 2, are actually redirected to the address (IP) in the shared storage space DBE and are therefore not read directly into the session storage space HDD.

The description of FIG. 3 will be completed by setting out in detail the processing implemented by the data management program DM of the administration server ADM.

The server receives the synchronization requests (step 200 of reception of the data management program) that are addressed to it by the synchronization programs SYNC of the computer sessions 2, in the event of writing to one of their respective session storage spaces HDD. As has been seen, these requests are accompanied, respectively, by the identification keys ID of the data groups, in order to allow the data management program DM to identify the group in question and optionally a session identifier U_ID.

In a following step (step 210), the data management program DM of the administration server consults the metadata index MD in order to determine whether the data group DB, identified by its identification key ID, is indeed stored in the shared storage space DBE. If so (SYNC_OK), it recovers (step 220) and returns (step 230), to the computer session 2, the storage address (IP) of the group in question DB, accompanied by the identification key ID, in order to allow the synchronization program SYNC of the requesting U_ID session to perform its processing.

The data management program DM of the administration server ADM can register, in the metadata index MD, the information according to which the requesting U_ID computer session 2 has requested access to the address (IP).

If the data management program DM determines that the data group is not held in the shared storage space DBE, it increments a deduplication counter associated with the identification key ID of this group (step 240), and records the identifier of the requesting U_ID computer session 2. The value of the counter and the identifier of the requesting U_ID session may be recorded in fields of the metadata index MD associated with the identification key ID of the group.

In a following step 250, the data management program DM determines whether the deduplication counter exceeds a predetermined threshold value. If this is not the case, it can optionally inform (NO_SYNC) the requesting computer session 2 that the data group identified by its identification key will not be deduplicates. If the deduplication counter actually exceeds the predetermined threshold value, the data management program DM triggers the operations aiming to deduplicate the data group in question.

Thus, in a first step 260 of these operations, it addresses a request to at least one and, advantageously, to a plurality of requesting computer sessions 2 in order for these sessions to provide it the data group DB in question. This request may be accompanied by the identification key ID of the data group DB and/or of the file name associated with the data group, in order that the identification program can find the group DB in question. For this purpose, the data management program DM may consult the metadata index MD in order to determine the identifiers U_ID of the sessions that have previously requested the synchronization of the data group DB. As has already been described, the transmission step 260 may include opening one or a plurality of partitioned transfer sessions.

Upon receipt of the requested data group DB, the data management program DM temporarily records the received data group. It marks the data group as needing to be deduplicated in the shared storage space DBE and, in an asynchronous manner, background tasks running on the administration server ADM perform this work (step 270). When this operation is performed by at least one of the background tasks, the data management program DM receives, from these tasks, the storage address (IP), in the shared storage space DBE, of the data group. It updates, in a following step 280, the metadata index MD, by recording therein the storage address (IP) in the entry associated with the identification key ID of the group.

It is noted that the data management program DM, and more generally the administration server ADM, has no control over the execution of the user sessions 2 running on the computing servers 4. These can thus be interrupted at any moment, or not be available to contribute to the implementation of the management process of the deduplicated data groups. By addressing a plurality of requests (for example, more than 10 requests, or indeed 100 requests) to the sessions 2 having the data group DB in their session storage space HDD, it is possible to ensure, with a greater level of confidence, that at least one copy of the data group will be obtained in the region of the administration server ADM. In a more general manner, the synchronization SYNC, interception INT, and data management DM programs that implement a management method according to the present disclosure are stateless and function in a master (the administration server ADM)-slaves (the computer sessions 2) mode, entirely tolerant to the functioning and/or the intermittent availability of the computer sessions 2.

Once the data group DB is deduplicated in the computer system 1, and during a following step, the data management program DM addresses the information (SYNC_OK) according to which the group DB in question is now deduplicated, to each of the sessions 2 (more particularly to their synchronization program). This information may consist in communicating, to these synchronization programs SYNC, the identification key ID of the group, and its storage address (IP). It is noted that these sessions 2 are listed and identified in the metadata index MD.

The administration server ADM may be caused to reorganize the manner in which the data groups are recorded in the shared storage space DM. It may thus be a case of removing one of the storage devices forming the shared storage space DBE for maintenance reasons, or of redistributing the data groups on the devices in order to balance their load. In this case, the address (IP) of the deduplicated data groups may change over time and no longer correspond to those recorded in the deduplication indices UD of the sessions 2 running in the computer system 1.

Consequently, the method implemented by the interception program INT of a computer session 2 may identify a read failure of a data group that it wishes to access in the shared storage space DBE. In such a situation, the interception program INT starts a new step in which it addresses a request to the data management program DM of the administration server ADM in order to obtain a new storage address (IP) of the data group that is deduplicated in the shared storage space DBE. This request includes the identification key of the group and an identifier U_ID of the requesting computer session 2. Upon receipt of the new address requested, the interception program INT of the requesting session 2 updates the deduplication index UD and renews the read call for reading the data group to the new address.

In order to increase the average speed of access to the data in the shared storage space DBE, the architecture of FIG. 1 may provide for forming the space from storage devices having different access times. The shared storage space DBE may be formed, for example, of semiconductor memory devices that emulate the functioning of disks, but the access speeds of which are manifestly very quick, and more conventional storage servers that have a large capacity but a slower access time.

The data management program DM that runs on the administration server ADM may also have the function of managing the duplication or the transfer of data in the shared storage space DBE so as to make the data that are used the most very quickly accessible to the sessions 2, with the general aim of minimizing an average access time to the shared data.

Of course, the present disclosure is not limited to the embodiment described, and it is possible to add variants thereto, without extending beyond the scope of the present disclosure as defined by the claims.

Thus, a method according to the present disclosure can be implemented in a computer architecture that is very different from that set out in FIG. 1. It may be a more conventional architecture in which computing devices such as personal computers are connected to the network. In this case, and in a manner entirely transparent to the users and the applications running on the computing devices, it is also possible to deduplicate the data groups present on a plurality of computing devices in order to record them in a shared storage space administered by an administration server of the storage space.

The invention claimed is:

1. A method for managing a data group in a computer system comprising:
    at least one computing server for hosting a computer session that manages access to a session storage space with the aid of an operating system of a virtual machine and a file management system thereof, the file management system comprising a plurality of records including file names of respective computer files, the file management system including a deduplication index that is integrated in the file management system such that file names are associated with respective data groups and respective attributes to characterize the respective data groups, wherein a respective attribute comprises an identification key of a respective data group and an address of the respective data group;
    a shared storage space;

an administration server for administering the shared storage space, and executing a data management program;

the computer session executing a synchronization program implementing the following steps:
- identifying writing of a data group of a respective computer file in the session;
- addressing a synchronization request of the data group to the data management program of the administration server;
- if applicable, receiving from the data management program a storage address of the data group in the shared storage space, and accessing the deduplication index of the file management system to record therein the address of the data group in the shared storage space; and
- receiving an acceptance of synchronization of the data group from the data management program; and
- providing the data group to the data management program.

2. The method of claim 1, wherein the computer session also executes an interception program implementing the following steps:
- intercepting a read call to read the data group in the session;
- accessing the deduplication index from the file management system for determining whether the data group is recorded in the shared storage space;
- if so, reading, from the deduplication index, the address of the data group in the shared storage space and redirecting the read call to this address; and
- if not, overlooking the read call so that it is processed by the operating system.

3. The method of claim 2, wherein the interception program also implements the following steps:
- identifying a read failure of the data group in the shared storage space;
- requesting a new address of the data group in the shared storage space from the administration server;
- receiving the new address of the data group and accessing the deduplication index in order to register the new address of the data group; and
- redirecting the read call toward the new address of the data group in the shared storage space.

4. The method of claim 1, wherein the respective computer file is shared in other computer sessions of other virtual machines hosted by the at least one computing server.

5. The method of claim 1, wherein providing the data group to the data management program comprises opening a partitioned transfer session of the data group between the administration server and the computer session.

6. A method for managing a data group in a computer system comprising:
- at least one computing server for hosting a computer session that manages access to a session storage space with the aid of an operating system of a virtual machine and a file management system thereof, the file management system comprising a plurality of records including file names of respective computer files, the file management system having a deduplication index that is integrated in the file management system such that file names are associated with respective data groups and respective attributes to characterize the respective data groups, wherein a respective attribute comprises an identification key of a respective data group and an address of the respective data group;
- a shared storage space;
- an administration server for administering the shared storage space, hosting a metadata index and executing a data management program; and the data management program implementing the following steps:
- receiving, from the computer session, a synchronization request for a data group of a respective computer file;
- consulting the metadata index in order to determine whether the data group is stored in the shared storage space;
- if so, returning a storage address of the data group in the shared storage space to the computer session, for recording the address of the data group in the deduplication index of the file management system;
- if not, incrementing a synchronization request counter of the data group and, if the counter exceeds a predetermined threshold;
- addressing an acceptance of synchronization of the data group to the computer session;
- receiving the data group from the computer session, and registering the data group in an address of the shared storage space; and
- accessing the metadata index in order to register the address of the data group in the shared storage space.

7. The method of claim 6, wherein the acceptance of synchronization of the data group is addressed to a plurality of computer sessions, which include other computer sessions of other virtual machines hosted by the at least one computing server.

8. The method of claim 6, wherein the respective computer file is shared in other computer sessions of other virtual machines hosted by the at least one computing server.

* * * * *